United States Patent [19]

D'Hoogue et al.

[11] Patent Number: 4,875,600

[45] Date of Patent: Oct. 24, 1989

[54] DEVICE FOR DOSING AND DISPENSING A FLUID PRODUCT TO BE DEPOSITED FREELY IN THE MOBILE ENCLOSURE OF A MACHINE

[75] Inventors: Martial D'Hoogue, Vitrolles; Claude Perrette, Reims; Pierre Goffinet, Marseille Cedex, all of France

[73] Assignee: Union Generale De Savonnerie, Marseille, France

[21] Appl. No.: 163,624

[22] Filed: Mar. 3, 1988

[30] Foreign Application Priority Data

Mar. 4, 1987 [FR] France ................... 87 02942

[51] Int. Cl.⁴ .............................................. B65B 3/04
[52] U.S. Cl. ..................... 222/52; 222/434; 222/454; 141/322; 68/171
[58] Field of Search ............ 222/52, 158, 424.5, 222/434, 437–438, 454, 455, 457, 478; 68/17 R, 207, 171; 141/3, 18, 22, 320–321, 384

[56] References Cited

U.S. PATENT DOCUMENTS

| | | | |
|---|---|---|---|
| 2,091,929 | 8/1937 | Kappenberg | 222/455 |
| 2,760,692 | 8/1956 | Buehlig | 222/434 |
| 2,803,270 | 8/1957 | Carbone, Jr. | 141/322 |
| 2,956,709 | 10/1960 | Nison et al. | 68/17 R |
| 3,095,722 | 7/1963 | Fox | 68/17 R |
| 3,888,391 | 6/1975 | Merz | 222/52 |
| 4,014,105 | 3/1977 | Furgal et al. | 34/60 X |
| 4,550,862 | 11/1985 | Barker et al. | 222/109 |

FOREIGN PATENT DOCUMENTS

| | | |
|---|---|---|
| 152359 | 8/1985 | European Pat. Off. . |
| 201376 | 11/1986 | European Pat. Off. . |
| 488030 | 12/1953 | Italy ................... 222/454 |

Primary Examiner—Michael S. Huppert
Attorney, Agent, or Firm—Louis Weinstein

[57] ABSTRACT

A device for dosing and dispensing a fluid product to be deposited freely in the mobile enclosure of a machine, the device comprising a hollow recipient adapted to contain a dose of product and being integral with a plunger tube provided for both filling and dispensing the dose, wherein the device is provided with a coupling for mounting the plunger tube on a container such as a bottle, can or the like, the plunger tube presenting at least one opening for filling and dispensing, the edge of the opening being positioned to determine the dose stored in the recipient to be dispensed when the recipient is placed in a washing machine or the like.

24 Claims, 5 Drawing Sheets

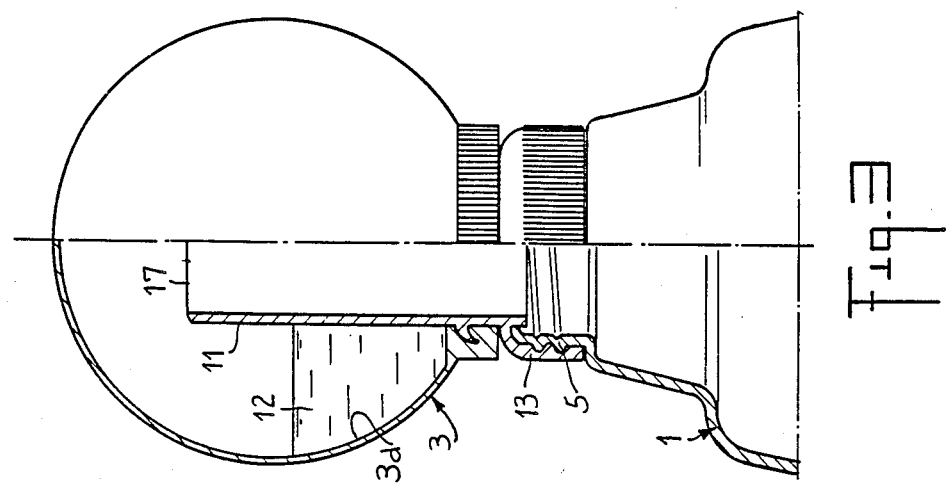
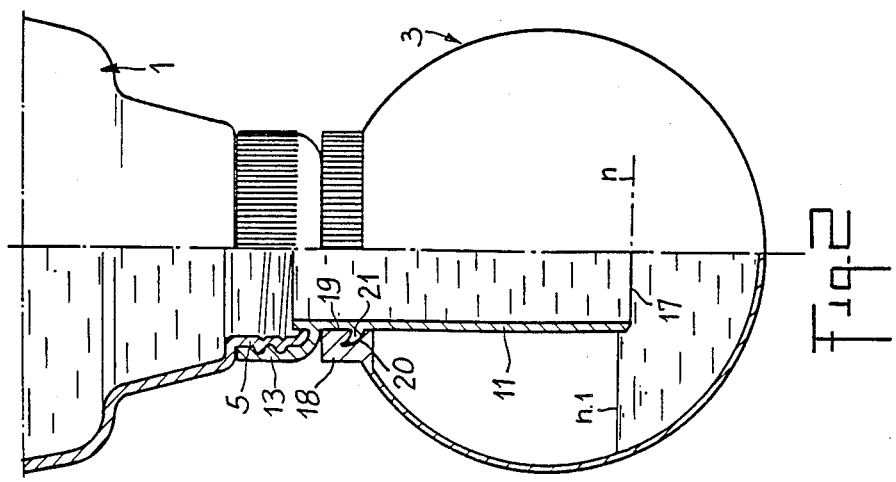
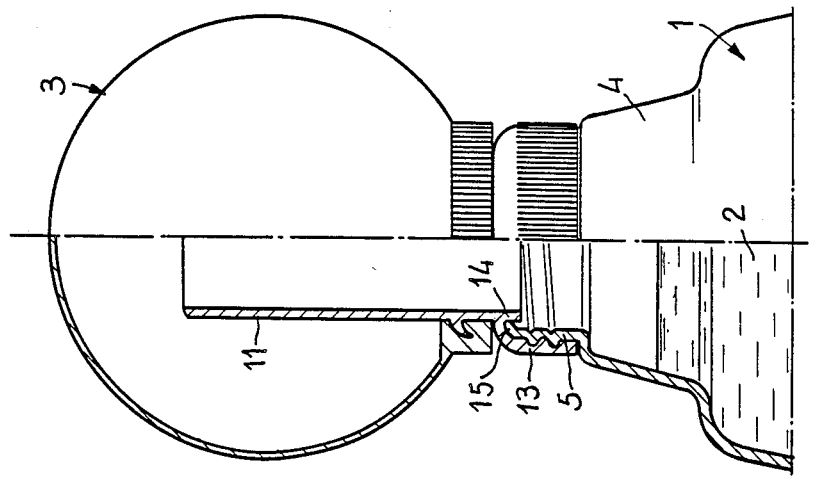

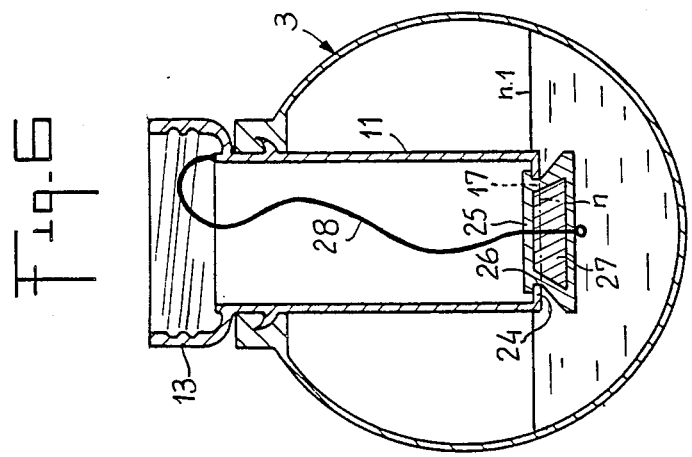
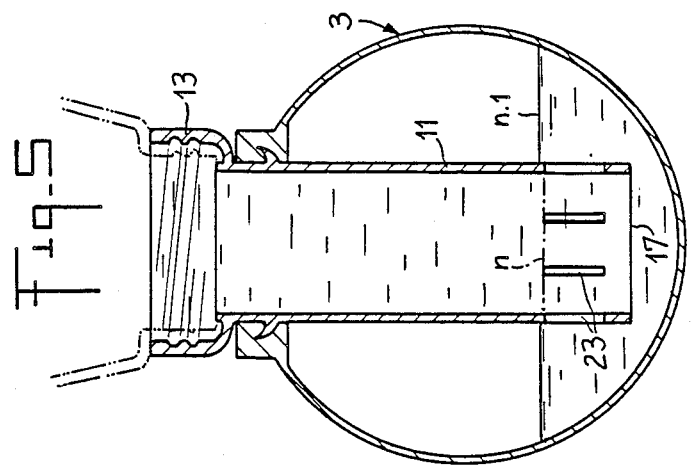
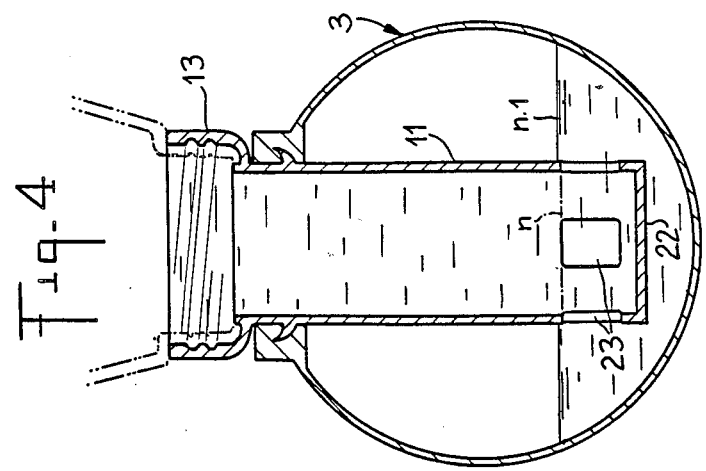

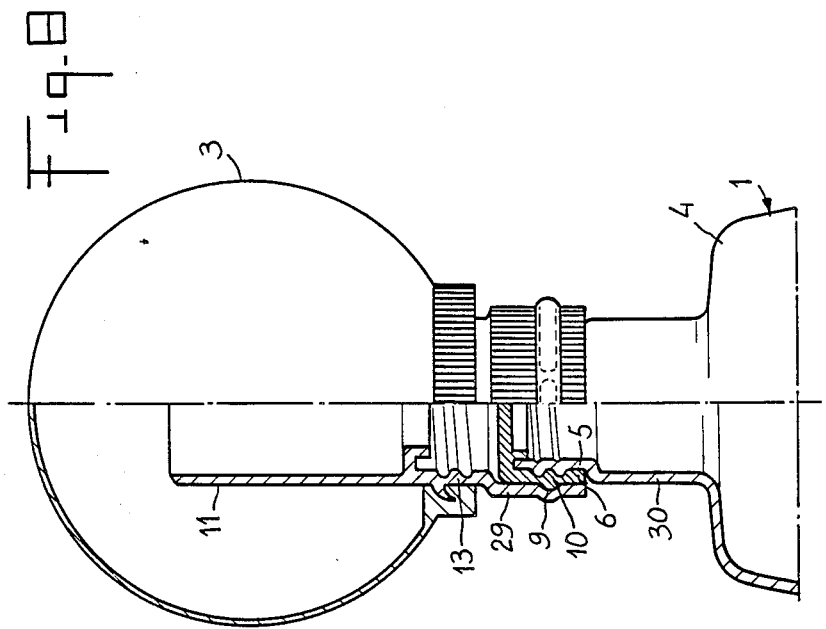
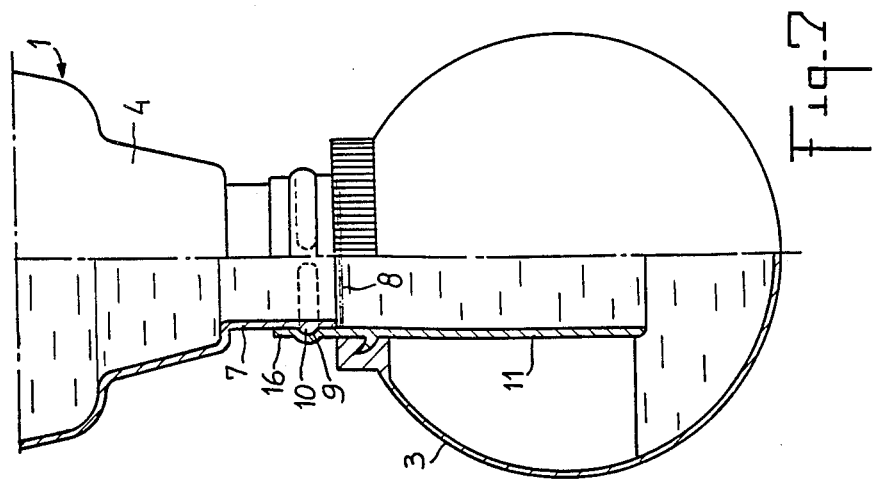

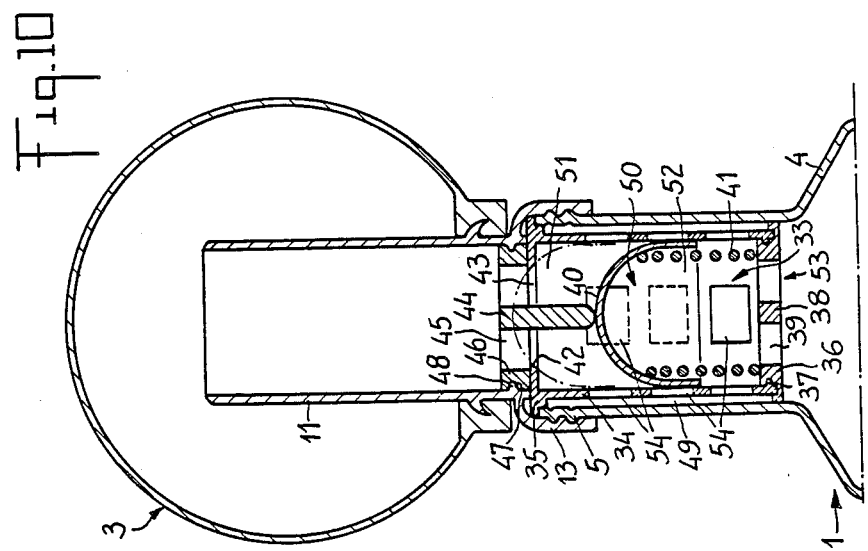
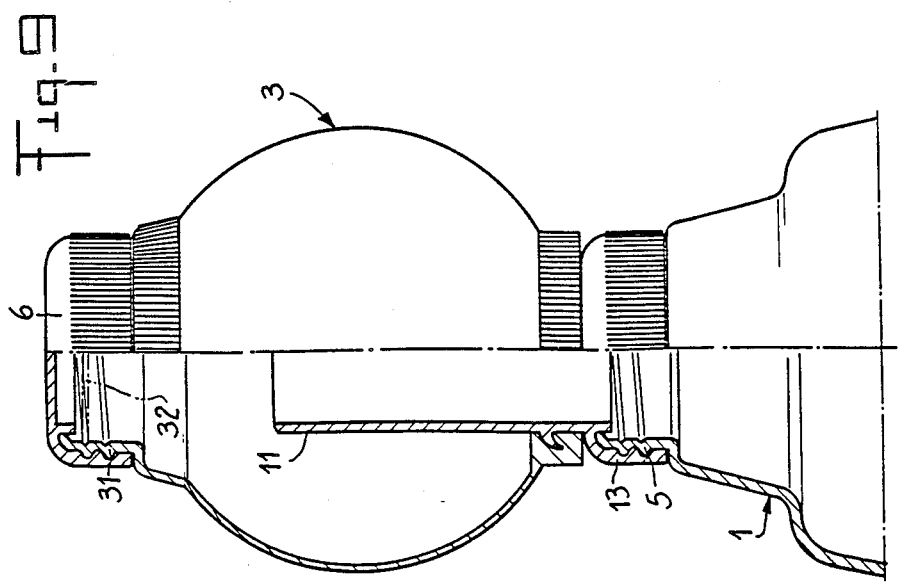

4,875,600

DEVICE FOR DOSING AND DISPENSING A FLUID PRODUCT TO BE DEPOSITED FREELY IN THE MOBILE ENCLOSURE OF A MACHINE

FIELD OF THE INVENTION

The present invention relates to a device for dosing and dispensing a fluid product, to be deposited freely in the mobile enclosure of a machine.

BACKGROUND OF THE INVENTION

It is well known to dispense a conditioning product during a cycle of treatment by means of a spherical recipient containing a dose of this product and placed freely in the treatment enclosure with the articles to be treated.

U.S. Pat. No. 4,014,105 for example describes a spherical recipient of which the upper half-shell defines dispensing orifices and comprises a closable hole for filling. This recipient is adapted to receive a liquid softening and/or antistatic agent for treating washing in an automatic tumbler drier.

European Patent Application No. 0 152 359 discloses a spherical recipient presenting vents for progressively releasing the liquid within the laundry in the course of washing. The liquid is a detergent agent and it is poured into the recipient before use via a well immersed inside this recipient. The free end of the well may be open or closed by a wall, in that case presenting lateral holes, the inner cavity of said recipient being filled through the end opening or the lateral holes of this well.

U.S. Pat. No. 3,888,391 discloses a spherical recipient containing a liquid or granular softening agent and adapted to dispense it in the tub of a washing machine during the rinsing phase. The recipient comprises a plunger tube for filling and dispensing, of which the open free end located inside cooperates with a ballasted valve. The latter is made of elastic material and, when it is pulled by the user by means of a supple fastener through the plunger tube, it locks elastically on its seat, thus closing the opening of the free end of the tube. During the washing phase of the cycle, the spherical recipient remains closed and, during the intermediate spinning phase, the valve opens automatically under the action of the centrifugal field principally acting on the ballast and the softening agent remains, under the action of the same field, in the recipient. During the rinsing phase, said recipient is tossed about with the laundry, this dispensing the softening agent that it contains through the plunger tube into the laundry.

European Pat. No. 0 201 376 essentially describes the assembly on a conditioning recipient of a doser-dispenser, preferably spherical, according to French Pat. No. 84/13210 (page 9, lines 24 to 28 of this European Patent Application), French Patent to which European Patent Application No. 0 152 359 mentioned above corresponds. However, the spherical doser-dispenser receives the dose of product only after having been dismounted from the conditioning recipient (page 9, lines 1 to 4 of said European Patent Application No. 0 201 376).

Furthermore, the representation of FIG. 11 induces an error. In fact, the vents are not shown whereas they should be, since, according to the passage on page 7, lines 27 to 33, the dispensing arrangement according to the variant of FIG. 11 takes up the general configuration of the dispensing arrangement of FIG. 10.

It being admitted that the vents do exist near the outer edge of the well, it is obvious that, by turning over the recipient provided with the doser, the doser is completely filled and, by straightening up the recipient, the doser is completely emptied by transvasing its contents into said recipient.

This confirms what is recalled hereinabove, namely that the doser must be dismounted from the recipient in order to be filled by hand.

The drawback of these various known recipients is that it is very difficult to dose the quantity of fluid product poured into the recipient before use. Concomitantly, the operation of transvasing is not easy and is often accompanied by spills on the recipient and/or the bottle or can containing the product, this necessitating wiping the recipient and container after each dosage. Of course, due to the imprecise dosage and to the losses during filling, consumption of the product is excessive.

It is an object of the present invention to overcome this drawback by providing a precise dosage without loss of product in the recipient, whether it is spherical or presents another shape, such dosage being easily and rapidly effected.

As in the prior art, the recipient, preferably spherical, provided to contain a dose of product, is integral with a plunger tube, which presents an opening for filling and dispensing and is provided with a means for connection on a container such as a bottle, can, or the like for the recipient to be disposed outside the container.

SUMMARY OF THE INVENTION

For the purpose set forth above and in accordance with the invention, the edge of the or each filling and dispensing opening in the plunger tube, which is the most highly placed when the device hangs vertically beneath the connection means, is located at a level which determines in the recipient, when the container is turned over, the dose of product to be dispensed and this recipient defines around said tube an annular reserve for dispensing, reserve in which said dose is trapped when said container is straightened up for said recipient to be located above the connection means.

This device is applicable whether the product is liquid, powdery or granular, . . ., and may be used in a washing machine, a laundry drying machine or other machine, to be operational during the whole cycle of the treatment or during certain selected phases only.

The plunger tube may open out into the recipient solely by its free end or by lateral windows or both via its free end and lateral windows.

Furthermore, the open free end of the plunger tube may cooperate with a ballasted valve with elastic closure and opening controlled by the centrifugal force produced in the rotating tub in the spinning phase.

The recipient and the plunger tube are advantageously separate, fitted in each other and connected together via a locking and sealing lip, projecting on one, elastically deformable and capable of penetrating in a groove in the other.

According to a particular embodiment, the connection means is a simple tube extending the plunger tube and capable of being freely fitted on or in the neck of the container.

An elastic lock element may be interposed between the extension tube of the plunger tube and the neck of the container, which lock element may be constituted by a discontinuous projecting bead of one capable of being engaged in a groove in the other.

According to another embodiment, the connection means is a tapped connection extending the plunger tube and adapted to be screwed on the threaded neck of the container.

The tapped connection of the plunger tube may be extended by a skirt of larger diameter capable of being fitted on a tapped cap for stopping the container when it is screwed on the threaded neck thereof, between which skirt and cap is interposed an elastic lock element which may be constituted by a discontinuous projecting bead of one capable of being engaged in a groove in the other.

To ensure closure of the container as soon as a dose of product has been poured into the recipient, various means may be employed, whatever the embodiment of this recipient chosen.

The recipient is provided to present, substantially opposite said connection means, an additional endpiece identical to the neck of the container and adapted to receive the closure cap thereof.

This additional endpiece may be a neck opening into the recipient, so that the product can be dispensed through this neck and/or the plunger tube or said endpiece may be closed by a cap for the product to be dispensed exclusively through the plunger tube.

The container is provided so that its neck contains a valve with automatic closure and controlled opening, the plunger tube being provided with a fixed pusher of length such that it provokes opening of this valve when its connection means is in engagement with the neck.

The valve advantageously comprises a tubular cartridge mounted in the neck of the container and separating a peripheral chamber from a central chamber in which a dish element is mounted to slide and pushed by a spring against a seat surrounding a closable passage in which the said pusher may take position, the cartridge presenting at least one perforation which places an upstream compartment of the central chamber in communication with the peripheral chamber and the latter with a downstream compartment of said central chamber, compartments which are separated by the dish element and which respectively open out via a permanent passage into the container and via the closable passage into the recipient.

BRIEF DESCRIPTION OF THE DRAWINGS

The invention will be more readily understood on reading the following description with reference to the accompanying drawings, in which:

FIG. 1 is a half-section, half-elevation showing a first embodiment of the doser-dispensing recipient mounted on the neck of a supply bottle disposed vertically, bottom downwards.

FIG. 2 is a view similar to FIG. 1, illustrating this recipient/bottle assembly upturned with the recipient downwards.

FIG. 3 is a view similar to FIG. 1, with the whole straightened up, the recipient being located upwards and containing the dose of product delivered in the position of FIG. 2.

FIGS. 4 to 6 are views similar to FIG. 1, showing three other embodiments of the doser-dispensing recipient.

FIG. 7 is a view similar to FIG. 1, illustrating another embodiment of the means for connecting the recipient on the bottle, which means may replace that of the four embodiments mentioned above.

FIG. 8 is a view similar to FIG. 1 showing a means for closing the bottle when the recipient is separated therefrom for use.

FIGS. 9 and 10 are views similar to FIG. 1, showing two particular means for closing the bottle as soon as the recipient is dismounted, whatever the embodiment thereof.

DETAILED DESCRIPTION OF THE DRAWINGS

Figure 12:
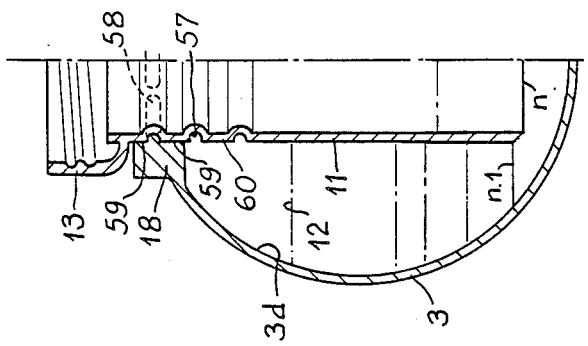
FIGS. 11 and 12 are half-sections of two embodiments of a recipient according to the invention of which the dosage capacity is adjustable.

Referring now to the drawings, reference 1 designates a bottle, can or other container for a product 2.

Reference 3 designates a recipient in which the product is dosed.

This product must be fluid in order to behave like a liquid from the standpoint of the flow thereof and its hydrostatic equilibrium. It may be a detergent agent, a bleaching agent, a softening agent, an antistatic agent or the like for treating laundry in a washing or drying machine.

Of course, any other fluid may be stored, dosed and dispensed as indicated hereinafter with a view to its use for treating an article other than laundry in another type of machine, as long as treatment is effected in a mobile enclosure in this machine which stirs and mixes said article with the doser-dispensing recipient 3.

According to the embodiments illustrated in FIGS. 1 to 3, 4, 5 and 6, the bottle 1 comprises a neck 4 terminating in a threaded neck 5 normally closed by a tapped cap 6 (FIGS. 8 and 9).

According to the embodiment illustrated in FIG. 7, the neck 4 is terminated as a smooth neck 7, cylindrical or truncated, normally closed by a cap 8 shown in broken lines. An elastic lock element is provided therebetween and may be constituted by a groove 9 and a discontinuous bead 10 cooperating together by elastic fit. In the example shown, the groove 9 is hollowed in the cap 8 and the bead 10 projects on the neck 7; the opposite arrangement may be employed, namely with the groove on the neck and the bead in the cap.

In all these embodiments according to FIGS. 1 to 10 in particular, the recipient 3 is integral with a plunger tube 11 opening outwardly to be connected to the bottle 1 with a view to transvasing into this recipient, in the manner described hereinafter, a dose 12 (FIG. 3) of product. In position of use (FIG. 3), in which the plunger tube 11 opens outside beneath the recipient 3, the dose 12 is trapped in an annular reserve 3d defined by said recipient around said tube.

As shown in FIGS. 1 to 6, 8, 9 and 10, the connection means may be constituted by a tapped connection 13 integral with the tube 11 and adapted to be screwed on the threaded neck 5 of the bottle. The free end 14 of the tube projects into the connection 13 in order to define an annular groove 15 in which is inserted the edge of the neck 5 for the sealed junction of the recipient 3 with the bottle 1.

As shown in FIG. 7, the connection means may also be constituted by a tube 16 extending the plunger tube 11 and adapted to be fitted on the smooth neck 7 of the bottle. In the example shown, a groove 9 is hollowed in the extension tube 16 and cooperates with the discontinuous bead 10 for elastic locking, projecting from the smooth neck 7.

The extension tube 16 is shaped to match the neck 7. In this example, it is cylindrical; however, it may equally well be truncated. In addition, the extension tube may be engaged in the neck instead of being fitted thereon; however, in that case, a sealing means such as a deformable lip, an O-ring, or the like, seems to be desirable in order to avoid leakages when the bottle is turned upside down, as described hereinafter. Furthermore, and independently of the mode of assembly of the extension tube with respect to the neck, elements 9, 10 of the elastic locking element may be reversed and this locking element may be of another type: with split ring, balls, etc.

Of course, other means may be employed for ensuring connection and seal of the neck of the bottle with the closure cap or the plunger tube of the recipient 3. For example, a bayonet or knuckle joint system with O-ring or seal in the form of a washer may be provided.

Whatever the connection means 13, 16, ... employed on the plunger tube 11 or the recipient 3, this tube is immersed in the recipient 3 up to a level n (FIG. 2) which determines the dose 12 of product to be dispensed.

To make this clearly understood, the following description refers to the first embodiment and to the modus operandi illustrated, as far as it is concerned, by FIGS. 1 to 3.

Bottle 1 being disposed vertically with the neck 4 upwards, the cap 6 is unscrewed and the connection 13 of the recipient 3 is screwed in its place on the threaded neck 5 (FIG. 1). If it is question of the mode of connection according to FIG. 7, the cap 8 is dismounted and the extension tube 16 is fitted and elastically locked in its place on the smooth neck 7.

The assembly thus constituted by the bottle 1 and the recipient 3 is then turned upside down (FIG. 2) and the product flows through the plunger tube 11 into said recipient until it reaches a level n.1. This level n.1 lies slightly above level n which, in this first embodiment according to FIGS. 1 to 3, is that of the opening 17 of the free end of the tube 11 opening out directly into the recipient 3. If p.1 is the pressure of the air in the cavity of the recipient 3 above the free surface of the product, p.2 is the pressure of the air in the bottle 1 above the free surface of the product and p is the hydrostatic pressure of the column of product in this bottle:

$$p.1 = p.2 + p$$

This equilibrium, applicable especially to liquids, is attained in a manner similar to what occurs in bird fountains, the only difference being that, in the latter, p.1 is atmospheric pressure, whilst, in recipient 3, p.1 is slightly greater than atmospheric pressure.

In any case, when the equilibrium is attained, the level n.1 is a little higher than level n, but it varies little depending on whether the bottle is full before being turned over or whether it is almost empty.

The assembly 1, 3 is then straightened up (FIG. 3) in an appropriate movement so that, during this movement, the product having arrived in the recipient 3 does not return via tube 11 into the bottle 1 and, when said tube is unstopped, product from this bottle does not flow towards the recipient. The product thus trapped in this recipient constitutes a dose 12 and is located in an annular reserve 3d (FIG. 3) in said recipient which surrounds the tube 11.

The recipient 3 may then be dismantled from the bottle 1 and deposited, whilst remaining in the position of FIG. 3, on the laundry located in the tub of the washing or drying machine.

When the tub is rotated, the recipient 3 is tossed and progressively dispenses the dose 12 of product that it contains, into the laundry, in random manner, through the plunger tube.

Experience has shown that the operations of dosage and of dispensing are carried out under excellent conditions when the recipient presents a spherical shape with certain proportions. In fact, this shape promotes trapping of the dose 12 without exchange with the bottle when the latter is straightened up; it also makes it possible, during tossing of the recipient 3 which results from the movement of the tub of the machine, to generate a random animation of the dose, thanks to which animation dispensing of this dose through the plunger tube is itself random and spread out in time.

However, it is obvious that other forms may suit, such as for example:

that of a cylinder of elliptic, and even circular section, that of an ellipsoid, that of a polyhedron with rounded edges and angles, such as a cube, etc.

As indicated in the foregoing, the recipient 3 is integral with the plunger tube 11. It is therefore a question of a monolithic doser-dispenser.

In the embodiments chosen and shown, the recipient 3 and the plunger tube 11 are made of plastics material independently of one another and assembled definitively together during assembly. To that end, the recipient 3 comprises a thick flange 18 defining a bore 19 into which opens a groove 20. This groove is provided to receive a locking and sealing lip 21 projecting on the plunger tube 11, when this tube is centered in the bore 19 and abuts by its connection 13 on said flange.

Of course, the doser-dispenser 3, 11 may be made differently, as long as it forms after assembly a monolithic whole. For example, the recipient 3 may be formed of two half-shells of which one is integral with the plunger tube 11; in that case, the two half-shells are assembled by gluing, friction welding, or the like.

According to the second embodiment shown in FIG. 4, the plunger tube 11 is closed at its free end by a partition 22 and opens out into the inner cavity of the recipient 3 via lateral windows 23. When the recipient is in dosing position (FIGS. 2 and 4), the upper edge of the windows defines the level n mentioned above which determines the dose 12.

According to the third embodiment illustrated in FIG. 5, the plunge tube 11 opens into the inner cavity of the recipient 3 via its end opening 17 and lateral windows 23 which are narrower than before.

These second and third embodiments make it possible to adjust the dispensing of the dose of product in the treatment tub differently.

According to the fourth embodiment shown schematically in FIG. 6, the free end of the plunger tube 11 presents an inwardly projecting annular seat 24 defining the above-mentioned opening 17. This seat is capable of cooperating with a closure valve 25 which is made of elastic material and defines a peripheral circular groove 26 fitting normally on said seat. The valve is provided with a ballast 27 which, in the example shown, is incorporated therein, this ballast being calibrated for said valve to yield and open when the centrifugal field in the treatment tube attains a threshold which is higher than the intensity attained during washing and lower than the intensity attained during spinning. In addition, the valve 25 is connected, via a supple, slack fastener 28 extending through the plunger tube 11, to the free end 14 thereof.

In order to pour the dose 12 of product into the recipient 3, the valve 25 must be opened manually before screwing the connection 13 on the neck 5 of the bottle. After dosage and dismantling of the recipient, the valve 25 is closed by pulling on the fastener 28, whilst the recipient 3 unscrewed from the bottle 1 is still in the position with connection 13 downwards (FIG. 3).

When the closed recipient 3 is deposited in the tub of the washing machine, the dose 12 is not dispensed during the washing phase, being given that the valve 25 remains closed. During the following wing spinning phase, said valve opens under the action of the centrifugal field and the dose remains trapped due to the position taken for the opening (connection 13 oriented towards the centre). During the rinsing phase, the recipient is tossed in random manner and the dose 12 of product is dispensed through the tube 11.

It may be advantageous to render the doser-dispenser 3, 11 captive and to close the bottle 1 as soon as this doser-dispenser is dismounted and used in the tub of a machine. The means illustrated by way of example in FIG. 8 may be employed to this end, whatever the embodiment chosen (FIGS. 1 to 6). The tapped connection 13 of the plunger tube 11 is extended by a skirt 29 of larger diameter intended, when the bottle 1 is closed by the tapped cap 6, to be fitted thereon. An elastic lock element 9, 10, of the type already described, may be provided between the skirt and the cap. Of course, for the connection 13 to be screwable on the threaded neck 5 at the moment of dosage, it is necessary for said neck to present, in front of the neck 4, an intermediate part 30 of the same diameter or of diameter corresponding to that of the skirt 29 and of sufficient length for the latter to be able to fit thereon.

For use, the doser-dispenser 3, 11 must be unlocked from the cap 6, the cap must be unscrewed from the bottle to release the neck 5, the doser-dispenser must be screwed on this neck, the bottle must be upturned and straightened up to introduce a dose of product in said doser-dispenser, the latter must be unscrewed and the cap 6 rescrewed. The bottle is then closed and the doser-dispenser ready for use.

If bottle 1 presents a smooth neck 7, the extension tube 16 of the plunger tube 11 is likewise extended by a skirt 29 and the elastic lock element is then constituted by a groove 9 in this skirt and by the swell of the cap 8 located opposite the groove of this cap; in that case, the skirt is split.

In accordance with the mode of execution illustrated in FIG. 9, applicable whatever the embodiment chosen (FIGS. 1 to 6), the recipient 3 presents, opposite the tapped connection 13, a threaded endpiece 31 identical to the threaded neck 5 of the bottle. When the latter is unstopped, there is screwed on its neck 5 the connection 13 of the recipient and, on the endpiece 31 of said recipient, the cap 6 of the bottle. Dosage is effected and, after the bottle has been straightened up (FIG. 9), the recipient is unscrewed, then its cap, and the cap is rescrewed on the bottle in order to avoid any loss of product, particularly by the bottle being knocked over.

In that case, the recipient presents two opposite orifices for dispensing the dose of product in the tub of the washing machine, consequently increasing the speed of diffusion of the product in the wash.

If it is desired to employ for dispensing only the orifice of the plunger tube 11, the endpiece 31 of the recipient 3 must present, integral therewith, a clipping seat to receive a cap 32 closing said endpiece 31, which cap is shown in broken lines in FIG. 9.

Of course, the means illustrated in FIG. 9 may be used when the tapped cap 6 is replaced by a smooth cap 8 with elastic lock element.

According to another embodiment illustrated in FIG. 10 and likewise applicable whatever the embodiment chosen (FIGS. 1 to 6), the bottle 1 contains a valve 33 with automatic closure and opening controlled by the recipient 3 during connection thereof.

The valve 33 comprises a tubular cartridge 34 maintained spaced apart from the neck 5 which, in that case, is more elongated than before, by a shouldered flange 35 integral with the outer end of the cartridge and by a perforated piece 36 clipped on the inner end of this cartridge. In the example shown, the piece 36 is a washer grooved for elastic fit on a terminal bead 37 on the cartridge, this washer being connected to a central stud 38 by a crosspiece 39.

The cartridge 34 contains a hemi-spherical dish 40 repelled by a spring 41 towards a seat 42 of the flange 35 in order to obdurate a passage 43 defined by this seat and establishing a communication by the means described hereinafter, between the doser-distributor 3 and the bottle 1 when said dish is retracted by a pusher 44. This pusher 44 is integral, via a crosspiece 45, with a ring 46 added in the plunger tube 11 and maintained in place by an elastic lock element, of the type with groove 47 and bead 48 for example. Upon assembly of the doser-dispenser 3 on the bottle 1 by screwing the connection 13 on the threaded neck (FIG. 10) and by fitting the tube 16 on the neck 7 with elastic lock element (FIG. 7), the pusher 44 drives the dish 40 against the action of the spring 41 and establishes the communication.

For this communication, the cartridge 34 separates a peripheral chamber 49 from a central chamber 50 which is divided by the dish 40 into a downstream compartment 51 and an upstream compartment 52 opening out respectively via the closable passage 43 into recipient 3 and via a permanent passage 53 into bottle 1. Perforations 54 are made in the cartridge 34 so as to establish the above-mentioned communication between the upstream compartment 52 and the peripheral chamber 49, then the latter and the downstream compartment 51, consequently between bottle 1 and recipient 3.

In all the embodiments and modes of execution described hereinbefore with reference to FIGS. 1 to 10, the capacity of dosage of the recipient 3 is invariable. This capacity which corresponds to the volume of dose 12 (FIG. 3) is determined by the level n (FIG. 2) of the opening 17 (FIGS. 2 and 6) or 23 (FIGS. 4 and 5) of the plunger tube 11, which level is fixed when this tube is integral with the recipient 3.

It may be advantageous to render this capacity of dosage adjustable, in order to allow the user to introduce into the recipient 3 a dose 12 of which the volume is perfectly adapted to the treatment that this recipient will effect.

Figure 11:
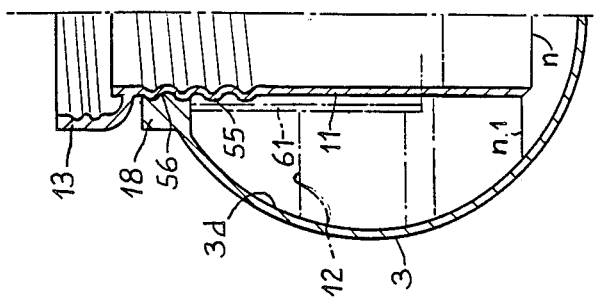

To that end, according to the embodiments of FIGS. 11 and 12, the plunger tube 11 is mobile axially relatively to the thick flange or sleeve 8 of the recipient 3. It is mobile:

either continuously thanks to a thread 55 of the tube cooperating with a tapping 56 of the sleeve (FIG. 11), or in staggered manner thanks to annular grooves 57 of the tube cooperating selectively with a discontinuous bead 58 projecting in the sleeve between cylindrical bearing surfaces 59 (FIG. 12), an annular rack thus being formed.

The thread 55 or the bead 57 constitutes a means for locking at the end of adjustment. The contacting surfaces between thread 55 and tapping 56 or between the cylindrical bearing surfaces 59 of the sleeve 60 of the tube ensure seal of the annular reserve 3d in order to contain without leakage the dose 12 of product before dispensing.

Means for improving the seal may be employed, such as for example a sheath 61 (FIG. 11) integral with the sleeve 18, surrounding the plunger tube 11 and opening in the recipient 3, above the level of the dose 12 in the reserve 3d.

When the plunger tube 11 is integral with the recipient 3, the geometrical proportions are such that, for all the embodiments shown (except that of FIG. 9 without cap 32), no risk of exceeding the dose 12 is to be feared, whatever the position in which the recipient containing this dose is placed, awaiting dispensing.

On the contrary, when the plunger tube 11 is adjustable (FIGS. 11 and 12), care must be taken, if the user adjusts level n for the dose 12 to be relatively large, for the recipient to be placed vertically, otherwise spills are to be feared.

What is claimed is:

1. In a device for receiving a predetermined dose of a fluid and for subsequently dispensing said dose when said device is tossed about, for example, within the tub of a washing machine, said device comprising:
   a hollow receiving housing open at one end;
   a hollow substantially tubular shaped member, at least an intermediate portion of said tubular member extending into said receiving housing and being surrounded by and secured to the open end of said receiving housing;
   one end of said hollow tubular member extending into said receiving housing and lying a spaced distance inward from the closed end of said receiving housing opposite the open end of said housing;
   the opposite free end of said tubular member extending beyond the opening in said receiving housing being adapted to be releasably secured to the dispensing opening of a container containing a fluid whereby, when said dispensing container is turned upside down, the free end of the tubular member extending into said receiving housing substantially determines the level of the liquid dispensed into said receiving housing and whereby when said receiving housing is turned substantially 180° from the liquid dose receiving position, the predetermined dispensed dose of liquid is contained within a hollow annular region defined by the interior surface of said receiving housing adjacent the open end of said receiving housing and the external surface of said hollow tubular member extending into said receiving housing.

2. In a device for establishing a predetermined dose of a fluid and for dispensing said fluid in the mobile enclosure of a machine, such as the tub of a washing machine which causes the device to be tossed about with the items to be treated with a view to progressively diffusing the treatment fluid into said items, said device comprising recipient means which is preferably a hollow spherical member for containing the predetermined dose of said treatment fluid and a hollow plunger tube integral therewith, said tube being substantially open at both of its opposite ends, a first one of said ends comprising an opening for filling said device with said treatment fluid and dispensing said treatment fluid from said device, said plunger tube including integral means for releasably connecting said plunger tube and hence said recipient means to the neck of a container, such as a bottle, can or the like, so that the recipient means is located external to said container when mounted upon the neck of the container,
   said hollow spherical member having an opening, a portion of said plunger tube extending through said last-mentioned opening and into said spherical member, means joining said plunger tube to said hollow spherical member so that said plunger tube has a longer first portion thereof extending into the interior of said hollow spherical member and a second portion thereof extending outwardly from and beyond the exterior of said hollow spherical member, the free end of the first portion of said plunger tube extending into said hollow spherical member having an opening positioned a predetermined distance from said connection means and from the interior surface of said hollow spherical member, said predetermined distance being selected to determine the predetermined dose of treatment fluid which predetermined dose is obtained when the container is turned upside down so that the container is vertically above the recipient means to fill said recipient means;
   said hollow spherical member, which extends around the outer periphery of said first portion of said plunger tube, together with said first portion of said plunger tube, defining an annular reservoir which contains only said predetermined dose when the container is returned to its original position with the recipient means being positioned vertically above said container, said plunger tube preventing the predetermined dose in said reservoir from returning to said container when the container is returned to its upright position with said recipient means positioned above said container.

3. The device of claim 2 wherein the free end of the first portion of the plunger tube extending into the recipient means is open.

4. The device of claim 3 wherein the open free end of the plunger tube cooperates with a ballasted valve with elastic closure and opening controlled by the centrifugal force experienced by the device and produced in the rotating tub in the spinning phase.

5. The device of claim 2 wherein the free end of the first portion of the plunger tube extending into the recipient means is sealed and is provided with at least one lateral opening spaced inwardly from its sealed free end.

6. The device of claim 2 wherein the end of the first portion of the plunger tube extending into the hollow spherical means is open at its free end and is further provided with at least one lateral opening spaced inwardly from said open free end.

7. The device of claim 2 in which said connection means comprises a locking and sealing lip projecting from one of said plunger tube and hollow spherical member, said locking and sealing lip being elastically deformable and being capable of penetrating into a groove provided in the other of said plunger tube and hollow spherical member.

8. The device of claim 2 wherein said connection means includes means to permit said plunger tube to be movable relative to said hollow spherical member, enabling the free end of said plunger tube first portion to be displaced by an adjustable distance relative to the opening in said hollow spherical member to thereby adjust the amount of said predetermined dose.

9. The device of claim 8 wherein said connection means is provided with adjustment means for adjusting the positioning of said plunger tube relative to said hollow spherical member, said adjusting means further comprising threaded means.

10. The device of claim 8 wherein said connection means is provided with adjustment means for adjusting the positioning of said plunger tube relative to said hollow spherical member, said adjustment means further comprising annular rack means.

11. The device of claim 8 further comprising an integral sheath extending from the open end of said hollow spherical member into the interior thereof and surrounding at least a portion of the first portion of said plunger tube.

12. The device of claim 2, wherein the connection means is a hollow tubular member extending from the free end of the second portion of the plunger tube for releasable mounting upon the neck of the container.

13. The device of claim 12 further comprising an elastic lock element mountable upon the neck of said container and interposed between said plunger tube and the neck of said container, a bead projecting from one of said plunger tube and lock element and a groove for receiving and engaging said projecting bead being provided on the other of said plunger tube and lock element.

14. The device of claim 12 wherein said connection means comprises a skirt integral with said plunger tube and being of a diameter greater than said plunger tube;
a cap for sealing the container being movably mounted upon the neck of said container;
the diameter of said skirt being sufficient to permit said skirt to be fitted upon said cap, and
elastic locking means for locking said skirt to said cap.

15. The device of claim 14 wherein said locking means comprises a discontinuous projecting bead being provided on one of said skirt and said cap cooperating with a groove for receiving said discontinuous projecting bead and provided on the other one of said skirt and said cap.

16. The device of claim 2, wherein the connection means is a tapped member extending from the free end of the second portion of the plunger tube and capable of being screwed onto a threaded portion provided on the neck of the container.

17. The device of claim 16 wherein said connection means comprises a skirt integral with said plunger tube and being of a diameter greater than said plunger tube;
a cap for sealing the container being movably mounted upon the neck of said container;
the diameter of said skirt being sufficient to permit said skirt to be fitted upon said cap, and
elastic locking means for locking said skirt to said cap.

18. The device of claim 17 wherein said locking means comprises a discontinuous projecting bead being provided on one of said skirt and said cap cooperating with a groove for receiving said discontinuous projecting bead and provided on the other one of said skirt and said cap.

19. The device of claim 2 wherein said hollow spherical member is provided with a second opening substantially diametrically opposing the first mentioned opening in said hollow spherical member and closure means for releasably sealing said second opening.

20. The device of claim 2 wherein said hollow spherical member is provided with an end piece having a configuration substantially identical to the neck of said container for mounting a closure cap thereto.

21. The device of claim 20 further comprising a closure cap releasably mounted upon said end piece.

22. The device of claim 20 wherein said endpiece is a neck opening into this recipient.

23. The device of claim 2 further comprising valve means arranged within the neck of the container, said valve means being normally biased in the closed position and movable to an open position;
pusher means coupled to said plunger tube for engaging said valve means and for moving said valve means to its open position when said recipient means is mounted upon said container.

24. The device of claim 23 further comprising a tubular cartridge including a tubular member spaced inwardly from the neck of said container and cooperating with the interior of the neck of said container to define an annular chamber, said tubular cartridge having a bottom portion extending across the interior of the neck of the container and cooperating with said tubular member to define a central chamber, said tubular member having openings for communicating between said central chamber and said peripheral chamber;
a dish member slidably mounted within said tubular cartridge; spring means mounted within said tubular cartridge for normally urging said dish member to prevent the fluid contents of said container from being removed from said container when said recipient means is not mounted upon said container and being urged against the force of said spring means by the pusher provided upon the plunger means to permit the dish to uncover at least one of the openings in said tubular member communicating said central chamber with said peripheral chamber to permit the flow of the fluid contents in the container out of said container and tubular cartridge and into said recipient means when the recipient means is mounted upon the container in the operating position and the container is turned upside down so that the container is vertically above the recipient means to cause the liquid contents to flow out of said container.

* * * * *